(12) United States Patent
Neff et al.

(10) Patent No.: US 9,388,089 B2
(45) Date of Patent: Jul. 12, 2016

(54) ENCAPSULATED PARTICLE

(71) Applicant: BASF SE, Ludwigshafen (DE)

(72) Inventors: Raymond Neff, Northville, MI (US); Alexander Gershanovich, Beverly Hills, MI (US); Donald Mente, Grosse Ile, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/401,854

(22) PCT Filed: May 20, 2013

(86) PCT No.: PCT/US2013/041862
§ 371 (c)(1),
(2) Date: Nov. 18, 2014

(87) PCT Pub. No.: WO2013/173836
PCT Pub. Date: Nov. 21, 2013

(65) Prior Publication Data
US 2015/0158781 A1 Jun. 11, 2015

Related U.S. Application Data

(60) Provisional application No. 61/648,707, filed on May 18, 2012, provisional application No. 61/648,884, filed on May 18, 2012, provisional application No. 61/648,766, filed on May 18, 2012.

(51) Int. Cl.
*C05G 3/00* (2006.01)
*C05C 9/00* (2006.01)
(Continued)

(52) U.S. Cl.
CPC .............. *C05G 3/0088* (2013.01); *B01J 13/14*
(2013.01); *B01J 13/22* (2013.01); *B32B 27/40*
(2013.01); *C05C 9/00* (2013.01); *C05G 3/0029*
(2013.01);
(Continued)

(58) Field of Classification Search
None
See application file for complete search history.

(56) References Cited

U.S. PATENT DOCUMENTS 3,264,089 A  8/1966  Hansen
4,711,659 A  12/1987  Moore
(Continued)

FOREIGN PATENT DOCUMENTS

CN   1793084 A    6/2006
EP   0 867 422 A2  9/1998

OTHER PUBLICATIONS

International Search Report for Application No. PCT/US2013/041862 dated Apr. 1, 2014, 3 pages.
(Continued)

*Primary Examiner* — Wayne Langel
(74) *Attorney, Agent, or Firm* — Howard & Howard Attorneys PLLC

(57) ABSTRACT

An encapsulated particle includes a core particle and a polyurethane layer. The polyurethane layer is disposed about the core particle and includes the reaction product of an isocyanate and a polyol component. The polyurethane layer is formed in the presence of a silicone surfactant. The polyol component includes a first polyol having a nominal functionality of at least 2.5 and a hydroxyl number of from 20 to 300 mg KOH/g. A method of encapsulating the core particle includes the steps of providing the core particle, the silicone surfactant, the isocyanate, and the polyol component. The method also includes the steps of mixing the isocyanate and the polyol component and encapsulating the core particle with the polyurethane layer.

17 Claims, 2 Drawing Sheets

(51) Int. Cl.
*B32B 27/40* (2006.01)
*C09D 175/08* (2006.01)
*B01J 13/14* (2006.01)
*B01J 13/22* (2006.01)

(52) U.S. Cl.
CPC ......... *C09D 175/08* (2013.01); *Y10T 428/2998* (2015.01)

(56) References Cited

U.S. PATENT DOCUMENTS

| | | | |
|---|---|---|---|
| 4,804,403 A | 2/1989 | Moore | |
| 5,219,465 A | 6/1993 | Goertz et al. | |
| 5,413,856 A | 5/1995 | Swarup et al. | |
| 5,429,654 A | 7/1995 | Swarup | |
| 5,466,274 A | 11/1995 | Hudson et al. | |
| 5,538,531 A | 7/1996 | Hudson et al. | |
| 5,599,374 A | 2/1997 | Detrick | |
| 5,803,946 A | 9/1998 | Petcavich et al. | |
| 5,993,505 A | 11/1999 | Tijsma et al. | |
| 6,001,147 A | 12/1999 | Markusch et al. | |
| 6,039,781 A | 3/2000 | Goertz et al. | |
| 6,165,550 A | 12/2000 | Markusch et al. | |
| 6,193,775 B1 * | 2/2001 | Fujita et al. ........................ 71/27 |
| 6,231,633 B1 * | 5/2001 | Hirano et al. ................. 71/64.07 |
| 6,322,606 B1 | 11/2001 | Komoriya et al. | |
| 6,358,296 B1 | 3/2002 | Markusch et al. | |
| 6,364,925 B1 | 4/2002 | Markusch et al. | |
| 6,617,412 B2 | 9/2003 | Markusch et al. | |
| 6,663,686 B1 | 12/2003 | Geiger et al. | |
| 7,267,707 B2 | 9/2007 | Rosenthal et al. | |
| 7,416,785 B2 * | 8/2008 | Mente ........................... 428/407 |
| 7,452,399 B2 | 11/2008 | Whittington | |
| 7,615,093 B2 | 11/2009 | Pildysh | |
| 7,713,326 B2 * | 5/2010 | Carstens et al. ................... 71/28 |
| 7,771,505 B2 | 8/2010 | Ogle et al. | |
| 2005/0066697 A1 | 3/2005 | Cline et al. | |
| 2006/0032282 A1 | 2/2006 | Wynnyk et al. | |
| 2006/0222735 A1 | 10/2006 | Rosenthal et al. | |
| 2007/0191538 A1 | 8/2007 | Apichatachutapan et al. | |
| 2010/0326152 A1 | 12/2010 | Mente | |

OTHER PUBLICATIONS

English language abstract and machine-assisted English translation for CN 1793084 extracted from espacenet.com database on Dec. 9, 2015, 17 pages.

* cited by examiner

ENCAPSULATED PARTICLE

CROSS-REFERENCE TO RELATED APPLICATIONS

This application is the National Stage of International Patent Application No. PCT/US2013/041862, filed on May 20, 2013, which claims the benefit of and priority to U.S. Provisional Patent Application No. 61/648,707, filed on May 18, 2012, 61/648,766, filed on May 18, 2012 and 61/648,884, filed on May 18, 2012, which are incorporated herewith by reference in their entirety.

This application is related to U.S. patent application Ser. No. 13/896,651, filed on May 17, 2013, issued Aug. 11, 2015 as U.S. Pat. No. 9,102,573, which claims the benefit of and priority to U.S. Provisional Patent Application Ser. No. 61/648,697, filed on May 18, 2012, which are incorporated herewith by reference in their entirety.

FIELD OF THE DISCLOSURE

The instant disclosure generally relates to an encapsulated particle. More specifically, the instant disclosure relates to an encapsulated particle that includes a polyurethane layer that includes a silicone surfactant and that is disposed about a core particle.

BACKGROUND

Encapsulated particles that include layers, such as polyurethane layers, and core particles are known in the art. A thickness and external integrity of the polyurethane layers limit a rate at which the core particles are released, e.g. dissolve.

Prior art encapsulated particles tend to exhibit surface defects and issues with inconsistent external integrity such as partial encapsulation of the core particle by the polyurethane layer, inconsistent thickness of the polyurethane layer, and pits and depressions in the polyurethane layer. When polyurethane layers with the surface defects are disposed about core particles, water and other liquids permeate the polyurethane layer and rapidly dissolve the core particle, which is typically undesirable.

In many cases, the surface defects result from the incomplete reaction of a polyol component and an isocyanate and/or problems with an encapsulation process employed to form the polyurethane layer. During the encapsulation process, the polyol component and the isocyanate chemically react to form the polyurethane layer. The polyol component and the isocyanate may have physical properties, such as viscosity, and/or chemical properties, such as polarity, which impede complete encapsulation of the core particle, affect the formation of the polyurethane layer having consistent thickness, and cause pits and depressions to form in the polyurethane layer. The physical and chemical properties of the polyol component, the isocyanate, and a reaction mixture formed therefrom may also cause agglomeration of the core particles during the encapsulation process, which, in turn, causes a decreased yield of encapsulated particles and causes the surface defects to form in the polyurethane layer of the encapsulated particles.

The surface defects in the polyurethane layer may also result from incomplete miscibility between the isocyanate and the polyol. For example, when a polyol component including a non-aromatic polyol is combined with an isocyanate including an aromatic isocyanate, miscibility may be compromised. The non-aromatic polyol may react with the aromatic isocyanate in a partial manner only at an interface resulting in the surface defects, such as the pits and depressions, in the polyurethane layer.

To minimize the impact of the surface defects, multiple layers can be disposed about the core particles. However, forming multiple layers typically requires a time consuming and expensive encapsulation process. As one example, a first polyurethane layer may be disposed about the core particle followed by a second organic wax layer, which may be used to reduce the permeation of water and other liquids through any of the surface defects in the first polyurethane layer and the subsequent rapid dissolution of the core particles.

In addition, agglomeration of core particles typically occurs during encapsulation of the core particles. Agglomeration may be caused by a coating and/or encapsulation process. FIG. 1 is a cross-sectional view of clumped or agglomerated encapsulated particles of the prior art. Agglomeration of the core particles during the encapsulation process tends to reduce encapsulation efficiency, impedes complete encapsulation of the core particle by the polyurethane layer, restricts the formation of the polyurethane layer having consistent thickness, increases the amount of the polyurethane layer required relative to the amount of core particles needed to encapsulate the core particle, decreases a yield of encapsulated particles, and causes pits and depressions in the polyurethane layer of the yield of encapsulated particles. Accordingly, there remains a need to develop an improved polyurethane layer and method of encapsulating core particles.

SUMMARY OF THE DISCLOSURE AND ADVANTAGES

An encapsulated particle is disclosed. The encapsulated particle includes a core particle and a polyurethane layer disposed about the core particle. The polyurethane layer comprises the reaction product of an isocyanate and a polyol component in the presence of a silicone surfactant. The polyol component comprises a first polyol having a nominal functionality of at least 2.5 and a hydroxyl number of from 20 to 300 mg KOH/g. The core particle is encapsulated in a method that includes the steps of providing the core particle, providing the silicone surfactant, providing the isocyanate, and providing the polyol component. The method also includes the steps of mixing the isocyanate and the polyol component and encapsulating the core particle with the polyurethane layer. In addition, a system for encapsulating the core particle with the polyurethane layer is provided. The system includes the isocyanate, the polyol component, the silicone surfactant, and the core particle.

The first polyol imparts elasticity, abrasion resistance, and controlled release properties to the polyurethane layer. Further, the silicone surfactant and the method of encapsulating the core particle promotes more complete encapsulation of the core particle, consistent and minimal thickness of the polyurethane layer, increased yield of encapsulated particles, and minimized defects in the polyurethane layer. Increasing the yield and improving the quality of the encapsulated particle reduces the time and expense required to form the encapsulated particle. In addition, the improved properties of the polyurethane layer allow the encapsulated particle to resist the rapid permeation of water and provide a controlled release, e.g., dissolution of the core particle.

BRIEF DESCRIPTION OF THE DRAWINGS

Other advantages of the instant disclosure will be readily appreciated, as the same becomes better understood by reference to the following detailed description when considered in connection with the accompanying drawings wherein.

DETAILED DESCRIPTION

Figure 1:
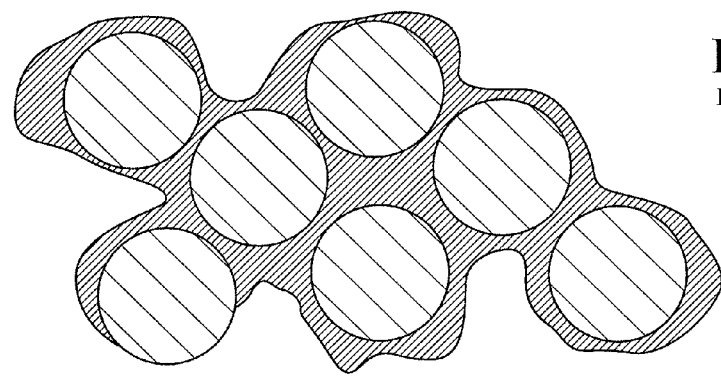
FIG. 1 is a cross-sectional view of clumped or agglomerated encapsulated particles of the prior art.

An encapsulated particle 10 includes a core particle 12 and a polyurethane layer 14 disposed about the core particle 12. The core particle 12 typically includes a fertilizer that may include calcium, magnesium, nitrogen, phosphate, potassium, sulfur, and combinations thereof. The fertilizer may be selected from the group of nitrogenous fertilizers, phosphoric fertilizers, potash fertilizers, sulfuric fertilizers, and combinations thereof, e.g. mixed fertilizers. Suitable fertilizers include, but are not limited to anhydrous ammonia, urea, ammonium nitrate, urea ammonium nitrate, calcium ammonium nitrate, phosphoric acid, mono-ammonium phosphate, ammonium polyphosphate, ammonium phosphate sulfate, potash, ammonium nitrate, ammonium sulfate and sulfuric acid, and combinations thereof. Most typically, the fertilizer is a nitrogenous fertilizer such as urea.

The core particle 12 may include components different than fertilizers. Such other components include, but are not limited to, herbicides, insecticides, fungicides, and other components for use in agricultural applications. However, the encapsulated particle 10 is not limited for use in agricultural applications and the core particle 12 of the instant disclosure is not limited to the fertilizer or other components described immediately above.

Although the shape of the core particle 12 is not critical, core particles 12 having a spherical shape are typical. Accordingly, the core particle 12 is typically either round or roughly spherical. Although the core particle 12 may be of any size, the core particle 12 typically has a particle size of from No. 170 to 5/16 in., more typically from No. 35 to No. 3½, and most typically from No. 18 to No. 5 mesh, as measured in accordance with standard sizing techniques using the United States Sieve Series. That is, the core particle 12 typically has a particle size of from 0.1 to 7, more typically from 0.5 to 5, and most typically from 1 to 4, mm Core particles 12 which are round or roughly spherical and have such particle sizes typically allow less polyurethane layer 14 to be used and typically allow the polyurethane layer 14 to be disposed on the core particle 12 with increased uniformity and completeness as compared to core particles 12 having other particle sizes.

The encapsulated particle 10 further comprises the polyurethane layer 14, which is disposed about the core particle 12. For purposes of the present disclosure, it is to be understood that the terminology "disposed about" encompasses both partial and complete covering and coating of the core particle 12 by the polyurethane layer 14. Typically, the core particle 12 is completely or substantially covered by the polyurethane layer 14, thereby protecting the core particle 12 from exposure to environmental conditions, such as from premature exposure to moisture. For example, the polyurethane layer 14 may be disposed about 50, 60, 70, 80, 90, 95, 96, 97, 98, 99, or greater than 99% of the surface area of the core particle 12. Alternatively still, the polyurethane layer 14 may be disposed about 100% of the surface area of the core particle 12.

As one of ordinary skill in the art will appreciate, multiple layers of polyurethane may be disposed about the core particle 10. These polyurethane layers may comprise polyurethane formed from the same reactants or different reactants. Said differently, the polyurethane used to form the layers may be identical or different. In one embodiment, the encapsulated particle 10 may include only the polyurethane layer 14. In another embodiment, the encapsulated particle 10 may include the polyurethane layer 14 and at least one additional coating layer. The additional layer may comprise, as a few non-limiting examples, polyurethane, polycarbodiimide, polyethylene, polypropylene, and wax. The encapsulated particle 10 may include 1, 2, 3, 4, 5, 6, or more coating layers disposed thereon.

The polyurethane layer 14 includes the reaction product of an isocyanate and a polyol component that are reacted in the presence of a silicone surfactant. That is, the polyurethane layer 14 is formed in the presence of a silicone surfactant.

The polyurethane layer 14 is the reaction product of one or more isocyanates and the polyol component. Said differently, one or more isocyanates can be used to form the polyurethane layer 14. Typically, the isocyanate is an aromatic isocyanate. More typically, the isocyanate includes, but is not limited to, monomeric and polymeric methylene diphenyl diisocyanate, monomeric and polymeric toluene diisocyanate, and mixtures thereof. Most typically, the isocyanate is LUPRANATE® M20 commercially available from BASF Corporation of Florham Park, N.J.

Polymeric methylene diphenyl diisocyanates, such as LUPRANATE® M20, offer high crosslink density and moderate viscosity. Alternatively, monomeric methylene diphenyl diisocyanates such as LUPRANATE® M Isocyanate offer low viscosity and high NCO content with low nominal functionality. Similarly, toluene diisocyanates such as LUPRANATE® TDI also offer low viscosity and high NCO content with low nominal functionality. Those skilled in the art will choose a suitable isocyanate based on the desired properties of the polyurethane layer 14 formed therefrom.

Typically, the isocyanate has a viscosity of from 1 to 3,000, more typically from 20 to 700, and most typically from 50 to 300, CPS at 25° C. The most typical viscosity of the isocyanate is from 50 to 300 CPS at 25° C. to allow the isocyanate to be sprayed onto the core particle 12. Typically, the isocyanate has a nominal functionality from 1 to 5, more typically from 1.5 to 4, and most typically from 2.0 to 2.7. The most typical nominal functionality of the isocyanate is from 2.0 to 2.7 to allow for effective reaction of the isocyanate with the polyol component and for cost effectiveness. Typically, the isocyanate has an NCO content of from 20 to 50, more typically from 25 to 40 and most typically from 30 to 33% by weight. The NCO content provides a high molecular crosslink density that aids in the formation of the polyurethane layer 14. The NCO content also provides more chemical bonds per unit of mass to improve cost efficiency. The viscosity, the nominal functionality, and the NCO content of the isocyanate may vary outside of the ranges above, but are typically both whole and fractional values within those ranges.

Referring back to the polyol component, polyol component includes a first polyol and may also include a second polyol and/or other polyols. Typically, the polyol component includes one or more polyols selected from the group of polyether polyols, polyester polyols, polyether/ester polyols, and combinations thereof. However, other polyols may also be employed.

As a whole, independent from the properties of the individual polyols included in the polyol component, the polyol component has various physical and chemical properties. Typically, the polyol component has a viscosity of from 100 to 5,000, more typically from 150 to 3,000, and most typically from 200 to 2,000, CPS at 25° C. Typically, the polyol component has a nominal functionality of greater than 2, more typically from 2 to 8, even more typically from 2.3 to 6, and most typically from 2.5 to 4. Typically, the polyol component has an OH number of from 20 to 600, more typically from 23 to 400, and most typically from 25 to 300, mg KOH/g. The viscosity, nominal functionality, and OH number of the polyol component may be any value outside of the ranges above, but are typically both whole and fractional values within those ranges.

As described above, the polyol component includes the first polyol. The first polyol typically has a number average molecular weight of greater than 400 g/mol because such a number average molecular weight tends to improve performance properties of the polyurethane layer 14. This number average molecular weight tends to impart elasticity, abrasion resistance, and controlled release properties to the polyurethane layer 14. Typically, the first polyol has a number average molecular weight of greater than 400, more typically from 400 to 15,000, and most typically from 500 to 7,000, g/mol. Typically, the first polyol has a viscosity of from 100 to 2,000, more typically from 150 to 1,800, and most typically from 200 to 1,600, CPS at 25° C. Typically, the first polyol has a nominal functionality of at least 2.5, more typically from 2.75 to 5, and most typically from 2.8 to 3.2. Typically, the first polyol has an OH number of from 20 to 300, more typically from 23 to 275, and most typically from 25 to 250, mg KOH/g. The number average molecular weight, viscosity, nominal functionality, and OH number of the first polyol may be any value outside of the ranges above, but are typically both whole and fractional values within those ranges.

In one embodiment, the first polyol is an intermediate molecular weight, secondary hydroxyl terminated polyol. In this embodiment, the first polyol is typically initiated with at least one non-amine based, tri-functional initiator. Suitable initiators for initiating the first polyol of this embodiment include glycerine, trimethylolpropane, propylene glycol, dipropylene glycol, isopropylene glocol, sorbitol, sucrose, and the like. Typically, the first polyol of this embodiment has a number average molecular weight of from 470 to 1,400, more typically from 500 to 1,200, and most typically from 600 to 1,000, g/mol. Typically, the first polyol of this embodiment has a viscosity of from 150 to 700, more typically from 160 to 600, and most typically from 170 to 370, CPS at 25° C. Typically, the first polyol of this embodiment has a nominal functionality of greater than 2.5, more typically from 2.75 to 5, and most typically from 2.8 to 3.2. Typically, the first polyol of this embodiment has an OH number of from 100 to 300, more typically from 180 to 280, and most typically from 220 to 240, mg KOH/g. The number average molecular weight, viscosity, nominal functionality, and OH number of the first polyol of this embodiment may be any value outside of the ranges above, but are typically both whole and fractional values within those ranges. A suitable first polyol for this embodiment is commercially available from BASF Corporation of Florham Park, N.J. under the trade name of PLURACOL® GP730.

In another embodiment, the first polyol is a high molecular weight, primary hydroxyl terminated polyol. In this embodiment, the first polyol is typically initiated with at least one non-amine based, tri-functional initiator. Suitable initiators for initiating the first polyol of this embodiment include glycerine, trimethylolpropane, propylene glycol, dipropylene glycol, isopropylene glocol, sorbitol, sucrose, and the like. The first polyol of this embodiment has a number average molecular weight of greater than 1,400 g/mol. Typically, the first polyol of this embodiment has a number average molecular weight of from 1,400 to 15,000, more typically from 2,000 to 10,000, and most typically from 3,000 to 7,000, g/mol. Typically, the first polyol of this embodiment has a viscosity of from 400 to 2,000, more typically from 500 to 1,700, and most typically from 600 to 1,400, CPS at 25° C. Typically, the first polyol of this embodiment has a nominal functionality of greater than 2.5, more typically from 2.75 to 5, and most typically from 2.8 to 3.2. Typically, the first polyol of this embodiment has an OH number of from 20 to 100, more typically from 21 to 65, and most typically from 25 to 28, mg KOH/g. The number average molecular weight, viscosity, nominal functionality, and OH number of the first polyol of this embodiment may be any value outside of the ranges above, but are typically both whole and fractional values within those ranges. A suitable first polyol for this embodiment is commercially available from BASF Corporation of Florham Park, N.J. under the trade name of PLURACOL® 220.

The first polyol is typically present in the polyol component in an amount of from 10 to 100, more typically in an amount from 40 to 90, and most typically in an amount from 65 to 85, parts by weight based on 100 parts by weight of the polyol component. The amount of the first polyol may vary outside of the ranges above, but is typically both whole and fractional values within those ranges.

As is also described above, the polyol component can also include the second polyol that is different from the first polyol. The second polyol can be referred to as a "catalytic" polyol because the second polyol can be used instead of a catalyst to facilitate the chemical reaction of the isocyanate with the polyol component. Said differently, a polyol component that includes the second polyol will typically chemically react with the isocyanate at lower temperatures in the presence of less catalyst (even no catalyst) than a polyol component that does not include the second polyol. The second polyol is typically derived from an amine-based initiator. The second polyol may be formed with more than one initiator. In one embodiment, the second polyol is derived from a dipropylene glycol initiator. In other words, the second polyol may be co-initiated with dipropylene glycol. Without being bound by theory, it is believed that amine content of the second polyol facilitates the reaction of the isocyanate with the polyol component.

The properties of the second polyol impact the properties of the polyurethane layer 14. The viscosity of the second polyol impacts spraying of the polyol component onto the core particle 12. The nominal functionality of the second polyol impacts reaction of the polyol component and the aromatic isocyanate and the cost of the second polyol. The OH number of the second that impacts crosslinking density of the polyurethane layer 14.

One embodiment of the second polyol formed from an amine-based initiator typically has a viscosity of from 500 to 75,000, more typically from 32,000 to 72,000, and most typically from 42,000 to 62,000, CPS at 25° C.; a nominal functionality typically greater than 2.5, more typically of from 2.75 to 10, and most typically from 3 to 4; an OH number of from 200 to 950, more typically from 250 to 850, and most typically from 750 to 800, mg KOH/g; and a number average molecular weight of less than 1400, more typically from 100 to 1120, and most typically from 192 to 392, g/mol. The viscosity, nominal functionality, OH number, and number average molecular weight of the second polyol of this embodiment may vary outside of the ranges above, but are typically both whole and fractional values within those ranges. One example of a suitable second polyol of this embodiment is commercially available from BASF Corporation of Florham Park, N.J. under the trade name of QUADROL®.

Another embodiment of the second polyol is formed from an aromatic amine-based initiator. The aromatic amine-based initiator is of the formula:

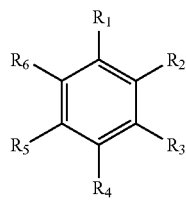

wherein $R_1$ includes one of an alkyl group, an amine group, and a hydrogen and each of $R_2$-$R_6$ independently include one of an amine group and a hydrogen, so long as at least one of $R_1$-$R_6$ is an amine group. Therefore, it is to be understood that $R_1$ can be any one of an alkyl group, an amine group, or a hydrogen, or any compound including combinations thereof. It is also to be understood that $R_2$-$R_6$ do not have to be identical and each can include an amine group or a hydrogen. It is also to be understood that the terminology "an amine group" may refer to R—N—H groups or $NH_2$ groups throughout.

The aromatic amine-based initiator may include, but is not limited to, a toluene diamine. The toluene diamine typically includes, but is not limited to, the following structures:

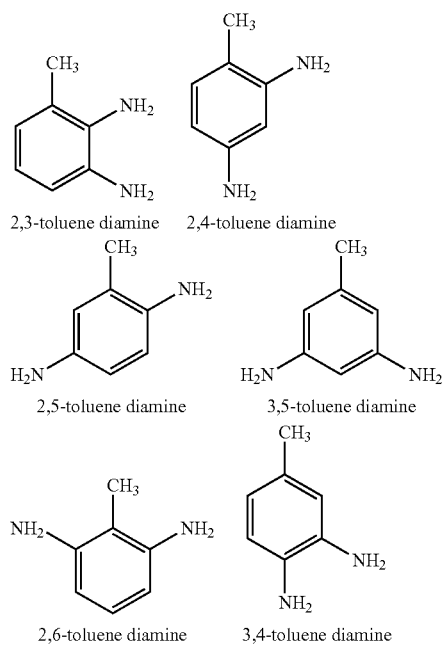

wherein the toluene diamine includes, but is not limited to, 2,3-toluenediamine, 2,4-toluenediamine, 2,5-toluenediamine, 2,6-toluenediamine, 3,4-toluenediamine, 3,5-toluenediamine, and mixtures thereof.

Without being bound or limited by any particular theory, it is believed that miscibility between the isocyanate and the polyol minimizes formation of surface defects in the polyurethane layer of the encapsulated particle. For example, when a non-aromatic polyol is combined with an isocyanate including an aromatic isocyanate, miscibility may be compromised. The non-aromatic polyol may react with the aromatic isocyanate in a partial manner only at an interface resulting in surface defects, such as the pits and depressions, in polyurethane layers formed therefrom. The aromatic amine-based initiator, as described above, tends to yield a second polyol that is miscible with the isocyanate, e.g. completely miscible. It is believed that miscibility of the isocyanate and the second polyol that is derived from an aromatic amine-based initiator tends to result from two primary effects. First, the miscibility is affected by London Forces that create momentarily induced dipoles between similar aromatic moieties of the second polyol and the isocyanate. The momentarily induced dipoles allow the second polyol and the isocyanate to mix effectively. Secondly, the miscibility is affected by the planar geometry of the aromatic moieties of the second polyol and the isocyanate that allow for complementary stacking of the second polyol and isocyanate. As such, the isocyanate and the polyol component mix effectively.

The embodiment of the second polyol formed from an aromatic amine-based initiator typically has a viscosity of from 400 to 25,000, more typically from 450 to 10,000, and most typically from 500 to 2,500, CPS at 25° C.; a nominal functionality typically greater than 2.5, more typically from 2.75 to 10, and most typically from 3 to 4; an OH number of from 100 to 700, more typically from 200 to 500, and most typically from 250 to 400, mg KOH/g; and a number average molecular weight of 240 to 2250, more typically from 330 to 1120, and most typically from 370 to 900, g/mol. The viscosity, nominal functionality, OH number, and number average molecular weight of the second polyol of this embodiment may vary outside of the ranges above, but are typically both whole and fractional values within those ranges. One example of a suitable second polyol of this embodiment is commercially available from BASF Corporation of Florham Park, N.J. under the trade name of PLURACOL® 1168.

If present, the second polyol is typically present in the polyol component in an amount of from 1 to 95, more typically in an amount from 10 to 65, still more typically in an amount from 10 to 45, still more typically in an amount from 15 to 35, and most typically in an amount from 5 to 25, parts by weight based on 100 parts by weight of the polyol component. The amount of the second polyol may vary outside of the ranges above, but is typically both whole and fractional values within those ranges.

If present, the second polyol is typically present in the polyol component in an amount which is less than the amount of the first polyol. A weight ratio of the first polyol to the second polyol in the polyol component is typically of from 1:1 to 15:1, more typically from 2:1 to 12:1, and most typically from 2.5:1 to 10:1. The weight ratio of the first polyol to the second polyol may vary outside of the ranges above, but is typically both whole and fractional values within but is typically both whole and fractional values within those ranges.

The ratio of the first polyol to the second polyol typically impacts the encapsulation process and the performance properties of the polyurethane layer 14. During the encapsulation process, this ratio contributes to optimal processing conditions, such as viscosity, reaction speed, and non-agglomeration. Furthermore, the ratio contributes a crosslink density and molecular structure needed to form a suitable polyurethane layer 14, i.e., a polyurethane layer 14 having excellent abrasion resistance and dissolution rate.

As described above, the polyurethane layer 14 is formed in the presence of a silicone surfactant. The silicone surfactant is typically a polyorganosiloxane. A non-limiting example of a typical polyorganosiloxane is an alkyl pendant organosilicone molecule comprising a polysiloxane backbone and polyether side chains. The alkyl pendant organosilicone molecule of this example can be comb structured or dendrimer structured.

Figure 2A:
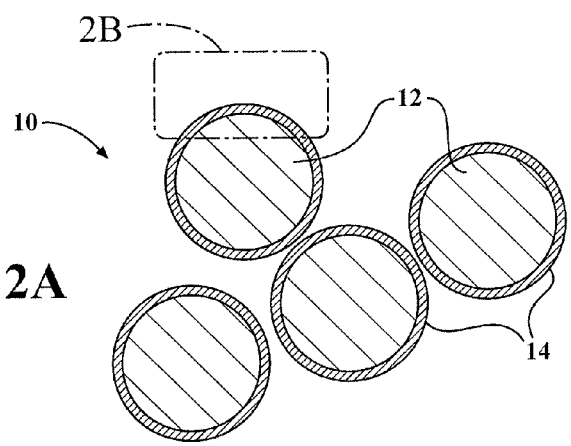
FIG. 2A is a cross-sectional view of individual encapsulated particles of the instant disclosure.
Figure 2B:
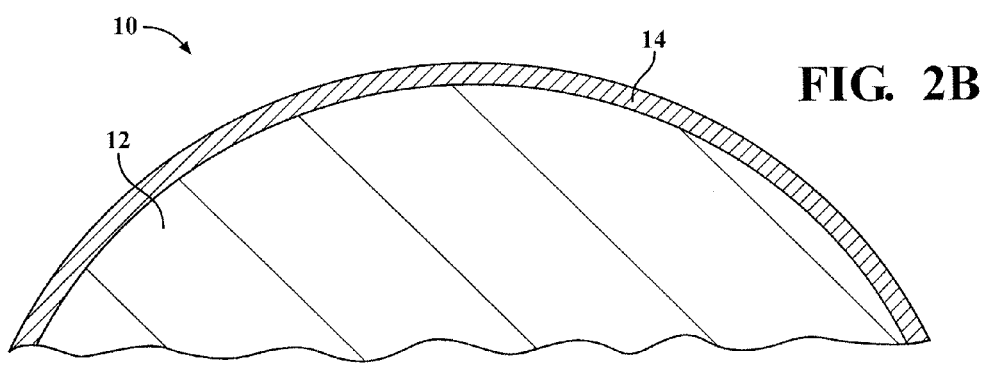
FIG. 2B is an enlarged cross-sectional partial view of an individual encapsulated particle of FIG. 2A including a core particle and a polyurethane layer.

The silicone surfactant typically improves the wetting of the polyol component and the isocyanate on the core particle 12 and, accordingly, may also be described as a wetting agent. The silicone surfactant improves processing and formation of the polyurethane layer 14. More specifically, the silicone surfactant reduces clumping and agglomeration of the encapsulated particle 10 during and after the encapsulation process. As such, the silicone surfactant promotes more complete encapsulation of the core particle 12 by the polyurethane layer 14, promotes consistent thickness of the polyurethane layer 14, allows for formation of the polyurethane layer 14 having minimal but consistent thickness, reduces the amount of polyurethane layer 14 that is required to coat the core particle 12 thereby decreasing the amount of the isocyanate and the polyol component collectively required to encapsulate the core particles 12 with a consistently thick polyurethane layer 14, increases a yield of encapsulated particles 10 encapsulated with a consistent polyurethane layer 14, and minimizes pits and depressions in the polyurethane layer 14. The silicone surfactant also typically improves the adhesion of the polyurethane layer 14 to the core particle 12. FIG. 2A is a cross-sectional view of individual encapsulated particles 10 including a polyurethane layer 14 formed from reaction of the isocyanate and the polyol component in the presence of the silicone surfactant. In this Figure, the polyurethane layer 14 has consistent thickness and minimal pits and depressions. FIG. 2B is an enlarged cross-sectional partial view of an individual encapsulated particle 10 of FIG. 2A.

Generally, the yield of encapsulated particles 10 is a measurement of the amount encapsulated particles 10 that pass through a sieve having 4 mm mesh and have a consistent polyurethane layer 14 disposed thereabout. The silicone surfactant decreases agglomeration of the core particles 12 thereby increasing the yield of encapsulated particles 14. Since higher yields are typical, the encapsulation process typically maximizes the amount of encapsulated particles 10 which are individually formed and free flowing, as illustrated in FIG. 2A, and minimizes the amount of encapsulated particles 10 which are agglomerated.

Typically, the silicone surfactant is a liquid and has a viscosity of from 100 to 1,500, more typically from 200 to 1,000, and most typically from 650 to 850 CPS at 25° C. The viscosity of the silicone surfactant may vary outside of the ranges above, but is typically both whole and fractional values within those ranges.

Specific examples of suitable silicone surfactants include, but are not limited to, TEGOSTAB® BF 2370, commercially available from Goldschmidt AG of Essen, Del., DABCO® DC5043 commercially available from Air Products and Chemicals, Inc. of Allentown, Pa., and NIAX® Silicone L-5340 and L-620, both commercially available from Momentive Performance Materials of Albany, N.Y. A particularly suitable silicone surfactant is NIAX® Silicone L-620, a polyalkyleneoxidemethylsiloxane copolymer. The silicone surfactant may be present in the polyurethane layer 14 in an amount of from 0.01 to 10, typically from 0.05 to 5, and more typically from 0.1 to 3, parts by weight based on 100 parts by weight of the polyurethane layer 14. The parts by weight silicone surfactant may vary outside of the ranges above, but is typically both whole and fractional values within those ranges.

In one embodiment, the polyol component or the isocyanate comprises an oil. In one embodiment, the oil is soluble in the polyol component including the first and the second polyols. In this embodiment, the oil may further minimize agglomeration of the encapsulated particle 10 during the coating and curing processes. The oil does not substantially chemically react with the isocyanate, the polyol component, or other liquids present during the curing of the polyurethane. In other words, the oil is substantially free from substituent groups which are known to react with the polyol component and/or isocyanate, such as hydroxyl groups and amine groups. In certain embodiments, less than 10, 5, 1, 0.5, or 0.1 wt. % of a total amount of the oil present reacts with the polyol component, the isocyanate, and/or the other liquids present during curing. Alternatively still, in one specific embodiment, none of the oil reacts with the polyol component, the isocyanate, and/or the other liquids present during curing.

The oil can be added to the isocyanate, the polyol component, or may be added to a mixture of the isocyanate and the polyol component. Although not particularly limited, the oil may comprise soybean oil, canola oil, peanut oil, sunflower seed oil, cottonseed oil, methyl esters derived from vegetable oils, and combinations thereof. In one specific embodiment, the oil comprises methyl esters derived from vegetable oils.

If utilized, the oil is typically present in an amount of from 1 to 30, more typically from 5 to 25, and most typically from about 10 to 20, % by weight based on the total weight of the isocyanate and the polyol component. However, as will be appreciated by one of ordinary skill in the art, other amounts of the oil may also be used depending on the application of the encapsulated particle.

In another embodiment, the polyurethane layer is formed in the presence of one or more catalysts. In this embodiment, the polyol component or the isocyanate may include the one or more catalysts. If included, the catalyst is typically included in the polyol component. The catalyst is typically present in the polyol component to catalyze the reaction between the polyol component and the isocyanate. It is to be appreciated that the catalyst is typically not consumed in the reaction between the polyol component and the isocyanate. Examples of suitable catalysts include, but are not limited to, amine catalysts (e.g. gelation catalysts such as amine catalysts in dipropylene glycol, blowing catalysts such as bis (dimethylaminoethyl)ether in dipropylene glycol), metal catalysts, e.g. tin, bismuth, lead, potassium, etc, and organometallic catalysts, e.g. octoates, naphthanates, laurates, acetates, etc. based on, but not limited to, zinc, bismuth, tin, iron, lead, mercury, zirconium calcium, manganese, potassium, and sodium. Specific, non-limiting examples of suitable catalysts include 33% trietylenediamine in dipropylene glycol, dibutyltin dilaurate, 70% potassium octoate in diethylene glycol, potassium acetate in diethylene glycol, potassium acetate, 1,2-dimetylimidizole, and dimetyltin dilaurate.

The polyurethane layer 14 may optionally include one or more additives. Suitable additives for purposes of the instant disclosure include, but are not limited to, chain-extenders, cross-linkers, chain-terminators, processing additives, adhesion promoters, anti-oxidants, defoamers, flame retardants, anti-foaming agents, water scavengers, molecular sieves, fumed silicas, surfactants, ultraviolet light stabilizers, fillers, thixotropic agents, silicones, colorants, pigments, inert diluents, and combinations thereof. For example, a pigment can be included in the polyurethane layer 14. If included, the additives can be included in the polyurethane layer 14 in various amounts.

The polyurethane layer 14 is typically present in the encapsulated particle 10 in an amount of from 1.0 to 30.0, more typically from 1.0 to 20.0, still more typically from 1.0 to 15.0, still more typically from 1.0 to 10.0, still more typically from 1.0 to 5.0, and most typically from 2.0 to 5.0, % by weight based on the total weight of the core particle 12. The amount of polyurethane layer 14 present in the encapsulated particle 10 may vary outside of the ranges above, but is typically both whole and fractional values within those ranges.

The amount of the polyurethane layer 14 present in the encapsulated particle 10 is typically determined using the test procedure described immediately below. Initially, 20 g of the encapsulated particle 10 and 500 g of water, e.g. deionized water, are poured into a standard household blender. The blender is activated and the contents of the blender are mixed until the core particle, e.g. urea, is completely dissolved. The contents of the blender are then filtered for solids using pre-weighed filter paper and a Büchner funnel. The filtrand is then dried at approximately 100° C. to substantially remove residual water present with the filtrand. Typically, the filtrand is dried at 100° C. (in an oven) for approximately 30 minutes. After drying, the filtrand is weighed. The amount (% by weight based on the total weight of the core particle 12) of the polyurethane layer 14 present in the encapsulated particle 10 is calculated using the amount (in grams) of the filtrand (X) and the amount (in grams) of the core particle (Y) 12 in the following formula:

Polyurethane Layer(% by weight)=100·(X/Y)

X=the amount of the filtrand (in grams) after drying
Y=20 (initial amount of the encapsulated particle)−X.

The polyurethane layer 14 typically has an average thickness of from about 5 to 50 microns or, from about 10 to 40 microns, or, from about 15 to 35 microns. It is to be appreciated that the polyurethane layer 14 can be utilized in various thicknesses depending on one or more desired properties, such as the dissolution rate of the encapsulated particle 10.

In addition to the polyurethane layer 14, the encapsulated particle can include a wax. The wax comprises a petroleum wax and typically comprises one or more waxes. The wax is typically disposed about the core particle thereby forming a wax layer. More specifically, the wax layer is typically disposed about the polyurethane layer 14 and the polyurethane layer 14 is disposed about the core particle. If included, the wax is typically present in the encapsulated particle 10 in an amount of from 0.1 to 10.0, more typically from 3.3 to 5.0, and most typically from 0.5 to 3.0, parts by weight based on 100 parts by weight of the core particle 12. The amount of wax present in the encapsulated particle 10 may vary outside of the ranges above, but is typically both whole and fractional values within those ranges. A specific, non-limiting example of a suitable wax is EVACOTE® 7089A, commercially available from The International Group, Inc. of Toronto, CA.

The encapsulated particle 10, including the core particle 12 and the polyurethane layer 14 formed thereon is typically either round or roughly spherical. The encapsulated particles 10 have a size distribution reported as D[4,3], d(0.1), d(0.5), and/or d(0.9), as well defined and appreciated in the art. In several embodiments, the encapsulated particles 10 have a size distribution D[4,3] of from 0.5 to 5 mm, of from 1 to 4 mm, or of from 1 to 3 mm, with an overall particle size range of from 0.1 to 10 mm. In other embodiments, the encapsulated particles 10 have a size distribution d(0.1) of from 0.2 to 2 mm, of from 0.4 to 1.7 mm, or of from 0.5 to 1.5 mm, with an overall particle size range of from 0.1 to 10 mm. In further embodiments, the encapsulated particles 10 have a size distribution d(0.5) of from 0.5 to 5 mm, of from 1 to 4 mm, or of from 1 to 3 mm, with an overall particle size range of from 0.1 to 10 mm. In still other embodiments, the encapsulated particles 10 have a size distribution d(0.9) of from 0.7 to 7 mm, of from 0.8 to 5 mm, or of from 1 to 4 mm, with an overall particle size range of from 0.1 to 10 mm. The D[4,3], d(0.1), d(0.5), and d(0.9) size distributions of the encapsulated particles 10 may vary outside of the ranges above, but are typically both whole and fractional values within 0.5 to 5 mm, 0.2 to 2 mm, 0.5 to 5 mm, and 0.7 to 7 mm, respectively.

The polyurethane layer 14 of the encapsulated particle 10 impacts dissolution rate of the core particle 12. Dissolution rate is the rate at which the core particle 12, typically urea, dissolves in water. To calculate the dissolution rate, dissolution (%) is determined. More specifically, dissolution (%) is determined using the test procedure described immediately below. Initially, 50 g of the encapsulated particle 10 and 235 g of water are poured into a 250 mL wide-mouth plastic bottle (bottle) to form a solution. The bottle is placed into an oven set at 38° C. A solution sample is taken from the bottle after 1, 3, and 7 days of aging at 38° C. The refractive index of each solution sample is measured using a refractometer. An amount (in grams) of urea dissolved in each solution sample is calculated using the refractive index and a temperature-corrected standard curve. The amount of urea dissolved is utilized to calculate dissolution (%) (percent urea dissolved) with the following formula:

Dissolution(%)=X/(50−(% Coating/2))

X=the amount of urea (grams) dissolved in the solution sample.
% Coating=100%×Weight of Applied Coating/Weight of Coated Urea Dissolution rate is determined with a graphical depiction of dissolution (%) at 0, 1, 3, and 7, days, of the core particle 12.

Typically, the core particle 12 has a dissolution (%) of less than 70, more typically less than 25, and most typically less than 10, % by weight after 1 day of aging in water at 38° C. Typically, the core particle 12 has a dissolution (%) of less than 90, more typically less than 25, and most typically less than 10, % by weight after 3 days of aging in water at 38° C. Typically, the core particle 12 has a dissolution (%) of less than 100, more typically less than 60, still more typically less than 25, and most typically less than 10, % by weight after 7 days of aging in a water at 38° C.

Dissolution (%) can also be determined after the encapsulated particle 10 is abraded to test the durability of the coating formed thereon. To abrade a sample of the encapsulated particle 10, the encapsulated particle 10 is poured through a pipe. More specifically, the sample of the encapsulated particle 10 weighing 75 grams is poured into a top end of the pipe which is 6' long and 6" in diameter and positioned vertically. The sample is collected at a bottom end of the pipe. The sample is poured through the pipe 5 times. After abrasion, the dissolution (%) of the core particle 12 is tested to determine whether the dissolution (%) changed following abrasion as described immediately above. After abrasion, the core particle 12 has a dissolution (%) of typically less than 70, more typically less than 25, and most typically less than 10, % by weight after 1 day of aging in a water at 38° C.; a dissolution (%) of typically less than 90, more typically less than 25, and most typically less than 15, % by weight after 3 days of aging in a water at 38° C.; and a dissolution (%) of less than 100, more typically less than 70, still more typically less than 25, and most typically less than 10, % by weight after 7 days of aging in a water at 38° C.

The polyurethane layer 14 of the encapsulated particle 10 is not only durable, but is flexible as well. To measure the flexibility of the films formed above, the top aluminum foil sheet is separated from the film, and each film is suspended on a horizontal surface with a 1.2 cm gap. Using a Universal Testing Machine (Tinius Olsen Model H5KS) with a blade attachment, the force necessary to force the film through the gap is measured. The blade attachment has a thickness of 0.09 cm. The Universal Testing Machine is set to descend at a speed of 4 cm per minute.

The force necessary to force the film through the gap is much lower for polyurethane films formed in accordance with the subject disclosure than various films formed from compositions not formed in accordance with the subject disclosure. Accordingly, encapsulated particles 10 which utilize the polyurethane formed in accordance with the subject disclosure have superior durability and resiliency during handling when compared to the encapsulated particles formed from compositions not formed in accordance with the subject disclosure.

In addition to the encapsulated particle 10, the instant disclosure relates to a system for forming the encapsulated particle 10 and a method of encapsulating the core particle 12 with the polyurethane layer 14. The system for encapsulating the core particle 10 with the polyurethane layer 14 includes the isocyanate, the polyol component, the silicone surfactant, and the core particle 12. The method includes the steps of providing the core particle 12, the isocyanate, the polyol component, the additives (if any), and the silicone surfactant. The method also includes the steps of mixing the isocyanate and the polyol component and encapsulating the core particle 12 with the polyurethane layer 14, which are described in further detail below.

The silicone surfactant can be provided with the isocyanate, provided with the polyol component, and/or provided independently. In one embodiment, the silicone surfactant can be used to pre-treat the surface of the core particle 12 prior to the step of encapsulation. In a typical embodiment, the silicone surfactant is provided with the polyol component, e.g., mixed with the polyol component prior to the step of mixing the isocyanate and the polyol component. In other words, the silicone surfactant can be provided in multiple ways.

The method includes the step of mixing the isocyanate and the polyol component that comprises the polyol component. The isocyanate and the polyol component are mixed and the isocyanate and the polyol component chemically react to form the polyurethane layer 14. The step of mixing the isocyanate and the polyol component can be conducted prior to the step of encapsulating the core particle 12 with the polyurethane layer 14. Alternatively, the step of mixing the isocyanate and the polyol component can be conducted simultaneous with the step of encapsulating the core particle 12 with the polyurethane layer 14.

The isocyanate and the polyol component may be combined using one or more techniques such as, pouring, pan coating, fluidized-bed coating, co-extrusion, mixing, spraying and spinning disk encapsulation. Most typically, the isocyanate and the polyol component are mixed by spraying into or above the reaction vessel such as a barrel, a drum, mixer, or the like. The isocyanate and the polyol component can be mixed and sprayed into or above the reaction vessel with a single spray gun or multiple spray guns. In one embodiment, the isocyanate and the polyol component are impingement mixed in a spray nozzle. The isocyanate and the polyol component can also be sequentially sprayed into or above the reaction vessel with a single spray gun and mixed in the reaction vessel. Alternatively, the isocyanate and the polyol component can be simultaneously or sequentially sprayed into or above the reaction vessel with different spay guns. Spraying the isocyanate and the polyol component tends to reduce agglomeration of the core particle and results in improved yield of the encapsulated particle.

The step of mixing and spraying the isocyanate and the polyol component tends to reduce agglomeration of the core particle 12 and results in improved yield of the encapsulated particle 10. More specifically, during the steps of spraying and encapsulating, the silicone surfactant promotes more complete encapsulation of the core particle 12 with a polyurethane layer 14 having minimal but consistent thickness and decreases agglomeration of the core particle 12 thereby increasing a yield of encapsulated particles 10.

The method optionally includes the steps spraying the isocyanate onto the core particle 12 and spraying the polyol component onto the core particle 12. The step of spraying the isocyanate onto the core particle 12 can be conducted prior to the step of spraying the polyol component onto the core particle 12. Alternatively, the step of spraying the isocyanate onto the core particle 12 can be conducted subsequent to the step of spraying the polyol component onto the core particle 12. The step of spraying the isocyanate onto the core particle 12 can also be conducted prior to the step of spraying the polyol component onto the core particle 12 and repeated after the step of spraying the polyol component onto the core particle 12. It is also contemplated that the isocyanate and the polyol component can be sprayed simultaneously and/or sequentially numerous times in various sequences onto the core particle 12 and onto each other.

As just one non-limiting example, the isocyanate and the polyol component can be sprayed onto the core particle 12 in the following sequence: (1) a portion of the isocyanate is sprayed onto the core particle 12; (2) a portion of the of the polyol component is sprayed onto the core particle 12; (3) a remaining portion of the isocyanate is sprayed onto the core particle 12; and, (4) a remaining portion of the polyol component is sprayed onto the core particle 12. As another example, the isocyanate and the polyol component can be sprayed onto the core particle 12 in the following sequence: (1) a portion of the isocyanate is sprayed onto the core particle 12; (2) a portion of the of the polyol component is sprayed onto the core particle 12 and a remaining portion of the isocyanate is sprayed onto the core particle 12 simultaneously; and (3) a remaining portion of the polyol component is sprayed onto the core particle 12.

The method optionally includes the step(s) of heating the isocyanate, the polyol component, the silicone surfactant, and/or the core particles 12 prior to, or simultaneous with, the step of mixing the isocyanate and the polyol component. The isocyanate, the polyol component, the silicone surfactant, and/or the core particles 12 may be individually heated or heated in combination with one or more of each other. The isocyanate, the polyol component, and the core particle 12 are typically heated prior to or simultaneous with the step of encapsulating the core particle 12. Typically, the isocyanate, polyol component, and the core particle 12 are heated to a temperature of greater than 20, more typically to a temperature of from 20 to 100, still more typically from 40 to 90, and most typically from 50 to 80, ° C.

As alluded to above, when the isocyanate and the polyol component are mixed, the isocyanate and the polyols chemically react to form the polyurethane layer 14. Typically, the isocyanate and the polyols are reacted at an isocyanate index of greater than 80. More typically, the isocyanate and the polyols are reacted at an isocyanate index of from 80 to 200, yet more typically from 110 to 190, and most typically from 120 to 180. In various embodiments, the isocyanate and the polyols are reacted at isocyanate indexes of from 125 to 180; from 130 to 180; from 135 to 180; from 140 to 180; from 145 to 180; from 150 to 180; from 155 to 180; from 160 to 180; from 165 to 180; and from 170 to 180. The isocyanate index may vary outside of the ranges above, but is typically both whole and fractional values within 80 to 200. As well known in the art, isocyanate index is a ratio of an actual molar amount of isocyanate(s) reacted with the polyol(s) to a stoichiometric molar amount of isocyanate(s) needed to react with an equivalent molar amount of the polyol(s).

The step of encapsulation can occur once or can be repeated. If repeated, the step does not have to be the same each individual time. The core particle 12 may be encapsulated one time with a single polyurethane layer 14 or multiple times with multiple polyurethane layers. It is contemplated that the core particle 12 can be encapsulated with at least one polyurethane layer 14 and one or more additional layers including a material other than polyurethane, such as the wax layer. Typically, the polyurethane layer 14 is disposed about at least 75, more typically at least 95, and most typically at least 99, % of the core particle 12. Said differently, the core particle 12 may be partially or totally encapsulated by the polyurethane layer 14.

The method optionally includes the step of heating and/or agitating the encapsulated particle 10 to reduce agglomeration, after the polyol component and the isocyanate are mixed to encapsulate the core particle 12. The encapsulated particle 10 may be heated and/or agitated in a reaction vessel or in any container. Typically, the encapsulated particle 10 is heated in a jacketed system and agitated in a mechanical mixer such as, a ribbon blender, a plough blender, a processing mixer, an impingement mixer, a rotating drum mixer, and combinations thereof. More specifically, during the step of mixing the silicone surfactant promotes more complete encapsulation of the core particle 12 with a polyurethane layer 14 having minimal but consistent thickness and decreases agglomeration of the core particle 12 thereby increasing a yield of encapsulated particles 10. If heated, the encapsulated particle 10 is typically heated at a temperature of from 20 to 200, more typically from 20 to 100, still more typically from 40 to 90, and most typically from 50 to 80, ° C. In one specific embodiment, the encapsulated particle is typically heated to a temperature of from 170 to 190° C. Also, the encapsulated particle 10 is typically heated for a time of from 0.5 to 60, more typically from 2 to 30, and most typically from 4 to 20, minutes.

The step of agitating the encapsulated particle 10 may include, but is not limited to, stirring the encapsulated particle 10, mixing the encapsulated particle 10, shaking the encapsulated particle 10, and combinations thereof. If agitated, the encapsulated particle 10 is typically agitated for a time of from 0.5 to 60, more typically from 2 to 30, and most typically from 4 to 20, minutes.

As described above, the method optionally includes the step of applying a wax. The wax can be applied to the core particle 12 such that the wax layer is disposed about the core particle 12 and the polyurethane layer 14 is disposed about the wax layer. However, the wax layer is typically applied to the core particle 12 having a polyurethane layer 14 thereon such that the polyurethane layer 14 is disposed about the core particle 12 and the wax layer is disposed about the polyurethane layer 14. Accordingly, the step of applying the wax can be conducted prior to, simultaneous with, or after the step of encapsulating the core particle 12 with the polyurethane layer 14, but is most typically conducted after the step of encapsulating the core particle 12 with the polyurethane layer 14.

In one particular embodiment, the core particle 12 includes nitrogen fertilizer such as urea. In this embodiment, the core particle 12 is loaded into a rotating drum and heated to a temperature of 65° C. The polyol and the first polyol are preblended to form the polyol component, and the polyol component, additives (if present), and the silicone surfactant are preblended to form the polyol component. The silicone surfactant is added to the polyol component in an amount of 1 part by weight based on 100 parts by weight of the polyol component. The isocyanate and the polyol component are heated to a temperature of 65° C. The isocyanate and the polyol component are sprayed sequentially onto the core particle 12 at an isocyanate index of 130 to 150 and the formation of the polyurethane layer 14 occurs with no additional heating, i.e., at ambient temperatures. In this embodiment, one half of the isocyanate is sprayed onto the core particle 12 and the contents of the drum are agitated for from 5 to 20 minutes. Subsequently, all of the polyol component is sprayed onto the core particle 12 and the contents of the drum are agitated for from 5 to 20 minutes. Finally, a remaining portion of the isocyanate is sprayed onto the core particle 12 and the contents of the drum are agitated for from 5 to 20 minutes thereby forming the encapsulated particle 10 including 8 parts by weight polyurethane layer 14 and 92 parts by weight core particle 12 based on 100% total weight encapsulated particle 10.

The following examples illustrate the nature of the instant disclosure and are not to be construed as limiting of the instant disclosure. Unless otherwise indicated, all parts are given as parts by weight.

EXAMPLES

Encapsulated Particles A-M and Comparative Encapsulated Particles A-F are described herein. Encapsulated Particles A-M are encapsulated particles formed in accordance with the instant disclosure. Comparative Encapsulated Particles A-F are encapsulated particles not formed in accordance with the instant disclosure and are included for comparative purposes.

To form Encapsulated Particles A-D, a polyurethane layer is disposed about a Core Particle. The compositions used to form Encapsulated Particles A-D, in grams, are set forth below in Table 1. A polyol component is prepared by mixing, in a first container, two or more polyols, Silicone Surfactant A, and Additives A and B, as set forth in Table 1 below. The polyol component, in the first container, is preheated to a temperature of 150° F. An Isocyanate, as set forth in Table 1 below, is preheated to a temperature of 150° F. in a second container. The Core Particle, as set forth in Table 1 below, is preheated to a temperature of 150° F. in a third container. Once preheated, the Core Particle is added to a reaction vessel having a roller speed of 26 rpm. The reaction vessel is not heated. Subsequently, one-half of the total weight of the Isocyanate, which is preheated, is added to the reaction vessel and agitated for 2 minutes with the Core Particle. Next, all of the polyol component, which is preheated, is added to the reaction vessel and agitated with the Isocyanate and the Core Particle previously added, for 10 minutes. Lastly, the remaining Isocyanate, i.e., the other one-half of the Isocyanate is added to the reaction vessel and agitated, with the polyol component, the Isocyanate, and the Core Particle previously added, for 10 minutes. During agitation, the polyol component and the Isocyanate react to form the polyurethane layer disposed about the Core Particle.

To form Comparative Encapsulated Particles A-D, a polyurethane layer is disposed on a Core Particle. The compositions used to form Comparative Encapsulated Particles A-D, in grams, are set forth in Tables 1 & 2 below. Comparative Encapsulated Particles A-D are formed with the same method as described immediately above for Encapsulated Particles A and B.

Encapsulated Particles A-D and Comparative Encapsulated Particles A-D are evaluated to determine performance properties including agglomeration (clumping) and dissolution (%). The results of the evaluations are also set forth in Tables 1 and 2 below.

TABLE 1

| | Encapsulated Particle A | Comparative Encapsulated Particle A | Encapsulated Particle B | Comparative Encapsulated Particle B |
|---|---|---|---|---|
| Polyol A | 66.7 | 67.4 | 66.7 | 67.4 |
| Polyol B | 22.3 | 22.4 | 22.3 | 22.4 |
| Silicone Surfactant A | 0.9 | — | 0.9 | — |
| Isocyanate Comp. | 30.1 | 30.3 | 30.1 | 30.3 |
| Core Particle | 1500 | 1500 | 1500 | 1500 |
| Total | 1620 | 1620 | 1620 | 1620 |
| % Coating Applied | 8 | 8 | 8 | 8 |
| Agglomeration | No Clumps | Clumps | No Clumps | Clumps |
| Abraded* | No | No | Yes | Yes |
| Dissolution (%) Day 1 | 36 | 41 | 34 | 41 |
| Dissolution (%) Day 3 | 63 | 73 | 68 | 82 |
| Dissolution (%) Day 7 | 88 | 98 | 94 | 100 |

TABLE 2

| | Encapsulated Particle C | Comparative Encapsulated Particle C | Encapsulated Particle D | Comparative Encapsulated Particle D |
|---|---|---|---|---|
| Polyol B | 18.4 | 18.5 | 18.4 | 18.5 |
| Polyol C | 55.3 | 55.7 | 55.3 | 55.7 |
| Silicone Surfactant A | 0.7 | — | 0.7 | — |
| Additive A | 0.4 | 0.4 | 0.4 | 0.4 |
| Additive B | 0.7 | 0.7 | 0.7 | 0.7 |
| Isocyanate Comp. | 44.4 | 44.7 | 44.4 | 44.7 |
| Core Particle | 1500 | 1500 | 1500 | 1500 |
| Total | 1620 | 1620 | 1620 | 1620 |
| % Coating Applied | 8 | 8 | 8 | 8 |
| Agglomeration | No Clumps | No Clumps | No Clumps | No Clumps |
| Abraded* | No | No | Yes | Yes |
| Dissolution (%) Day 1 | 30 | 24 | 27 | 24 |
| Dissolution (%) Day 3 | 52 | 46 | 54 | 54 |
| Dissolution (%) Day 7 | 77 | 76 | 79 | 82 |

*Abraded particles have been poured through a pipe. More specifically, a sample of particles weighing 75 grams is poured into a top end of the pipe which is 6' long and 6" in diameter and positioned vertically. The sample is collected at a bottom end of the pipe. The sample is poured through the pipe 5 times.

Polyol A is PLURACOL® 220, a polyol commercially available from BASF Corporation of Florham Park, N.J.

Polyol B is PLURACOL® 1168, an aromatic amine-initiated polyol commercially available from BASF Corporation of Florham Park, N.J.

Polyol C is castor oil.

Additive A is ANTIFOAM A, an anti-foaming additive commercially available from Dow Corning Corporation of Midland, Mich.

Additive B is MOLSIV 3A, molecular sieves commercially available from UOP of Des Plaines, Ill.

Silicone Surfactant is NIAX® L-620, a silicone surfactant commercially available from Momentive Performance Materials of Albany, N.Y.

Isocyanate is LUPRANATE® M20, a polymeric methylene diphenyl diisocyanate commercially available from BASF Corporation of Florham Park, N.J.

Core Particle is urea granules.

Agglomeration is determined based on an objective observation of the Encapsulated Particles as they are passed through a sieve having 4 mm mesh. When the Encapsulated Particles agglomerate or clump together and do not pass through the sieve, an observation of "clumps" is recorded. Alternatively, when the Encapsulated Particles pass through the sieve freely, an observation of "good" is recorded. Agglomeration is typically indicative of reduced yield of the encapsulated particle and higher dissolution rates of the Core Particle.

Dissolution (%) is determined using the test procedure described immediately below. Initially, 50 g of coated urea particles and 235 g of water are poured into a 250 mL wide-mouth plastic bottle (bottle) to form a solution. The bottle is placed into an oven set at 38° C. A solution sample is taken from the bottle after 1, 3, and 7 days of aging at 38° C. The refractive index of each solution sample is measured using a refractometer. An amount (in grams) of urea dissolved in each solution sample is calculated using the refractive index reading and a temperature-corrected standard curve. The amount of urea dissolved is utilized to calculate dissolution (%) (percent urea dissolved) with the following formula:

$$\text{Dissolution}(\%) = X/(50-(\% \text{ Coating}/2))$$

Figure 3:
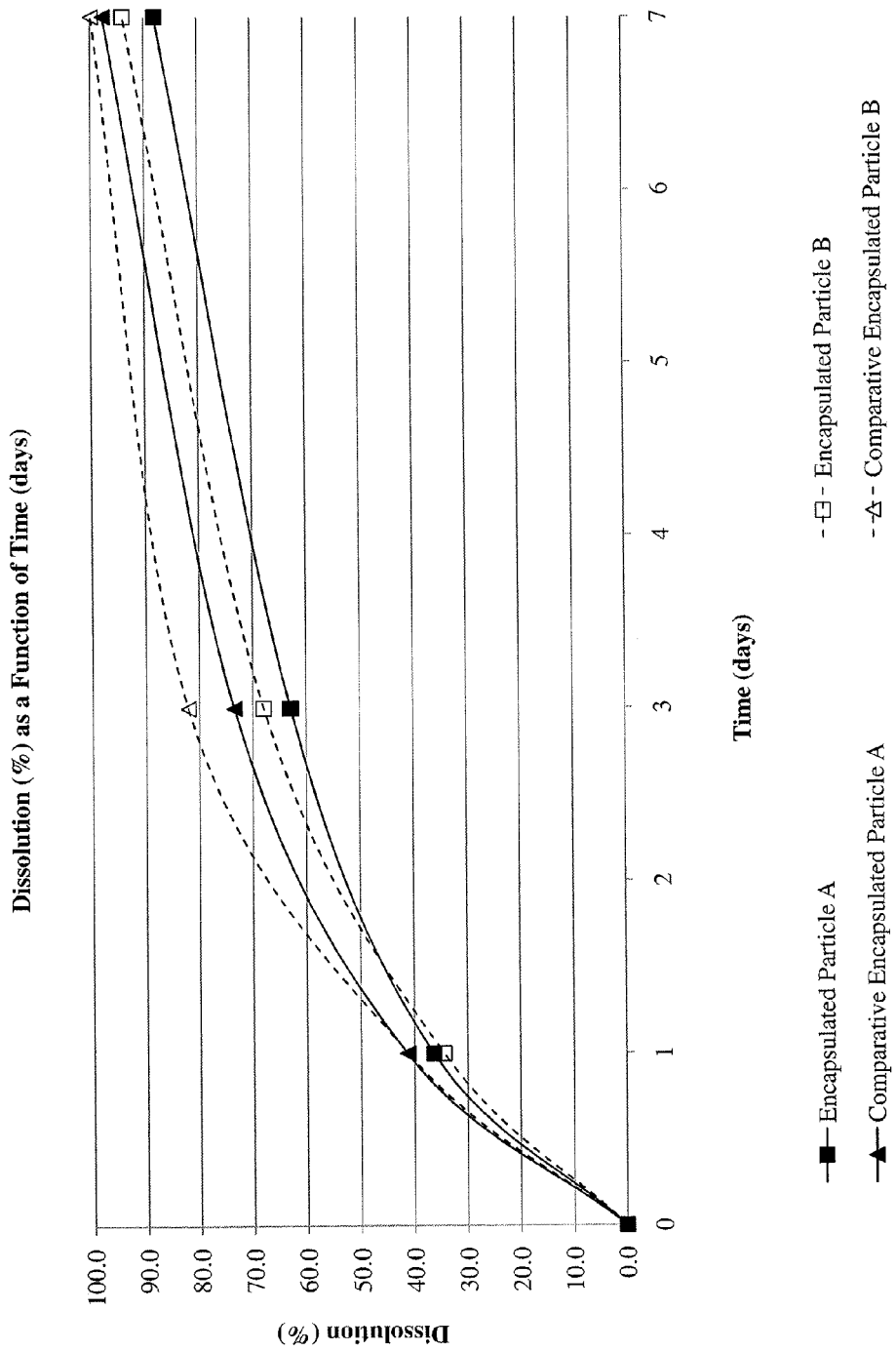
FIG. 3 is a line graph illustrating the dissolution rate of Encapsulated Particles A and B and Comparative Encapsulated Particles A and B of the Examples.

X=the amount of urea (grams) dissolved in the solution sample.
% Coating=100%×Weight of Applied Coating/Weight of Coated Urea Dissolution rate is determined with a graphical depiction of dissolution (%) at 1, 3, and 7, days, of a particular particle. FIG. 3 is a graph depicting the dissolution rate of Encapsulated Particles A and B and Comparative Encapsulated Particles A and B.

Referring now to the data from Table 1 which is also set forth in FIG. 3, Encapsulated Particles A and B have excellent performance properties relative to Comparative Encapsulated Particles A and B. Particle A has a polyurethane layer formed from the reaction product of the polyol component including Polyol A and the Silicone Surfactant. Encapsulated Particles A and B do not agglomerate and have a slow dissolution rate, and are durable. Comparative Encapsulated Particles A and B have a polyurethane layer formed from the reaction product of the polyol component including Polyol A but not including Silicone Surfactant. Comparative Encapsulated Particles A and B agglomerate. Further, Encapsulated Particle B does not agglomerate and, even after abrasion, has a slower dissolution rate than Comparative Encapsulated Particles A and B.

Referring now to data from Table 2, Encapsulated Particles C and D generally exhibit better processing characteristics than Comparative Encapsulated Particles C and D.

To form Encapsulated Particles E-G, a polyurethane layer is disposed about a Core Particle. The compositions used to form Encapsulated Particles E-G, in grams, are set forth below in Table 3. A polyol component is prepared by mixing, in a first container, two or more polyols as set forth in Table 3 below. The polyol component, in the first container, is preheated to a temperature of 150° F. An Isocyanate is mixed with Silicone Surfactant B, as set forth in Table 3 below, and the mixture is preheated to a temperature of 150° F. in a second container. The Core Particle, as set forth in Table 3 below, is also preheated to a temperature of 150° F. in a third container. Once preheated, the Core Particle is added to a reaction vessel having a roller speed of 26 rpm. The reaction vessel is not heated. Subsequently, one-half of the total weight of the Isocyanate/Silicone Surfactant B mixture, which is preheated, is added to the reaction vessel and agitated for 2 minutes with the Core Particle. Next, all of the polyol component, which is preheated, is added to the reaction vessel and agitated with the Isocyanate and the Core Particle previously added, for 10 minutes. Lastly, the remaining Isocyanate/Silicone Surfactant mixture, i.e., the other one-half of the Isocyanate is added to the reaction vessel and agitated, with the polyol component, the Isocyanate, and the Core Particle previously added, for 10 minutes. During agitation, the polyol component and the Isocyanate react to form the polyurethane layer disposed about the Core Particle.

Encapsulated Particles E-G are evaluated to determine performance properties including agglomeration (clumping) and dissolution (%). The results of the evaluations are also set forth in Tables 3 below.

TABLE 3

|  | Encapsulated Particle E | Encapsulated Particle F | Encapsulated Particle G |
|---|---|---|---|
| Polyol B | 37.4 | 12.5 | 34.0 |
| Polyol C | 112.3 | 37.4 | — |
| Polyol D | — | — | 102 |
| Silicone Surfactant | 0.9 | 0.3 | 1.0 |
| Isocyanate Comp. | 89.3 | 29.8 | 103.0 |
| Core Particle | 4000 | 4000 | 4000 |
| Total |  |  |  |
| % Coating Applied (based on 100 parts by weight core particle) | 6 | 2 | 6 |
| Agglomeration | No Clumps | No Clumps | No Clumps |
| Dissolution (%) Day 7 (with no Wax) | 58.8 | 100 | 67.1 |
| Dissolution (%) Day 7 (with 2% Wax based on 100 parts by weight core particle) | 7.8 | 65.4 | 12.4 |

Polyol D is PLURACOL® GP 730, a polyol commercially available from BASF Corporation of Florham Park, N.J.

Silicone Surfactant B is NIAX® L-5340, a silicone surfactant commercially available from Momentive Performance Materials of Albany, N.Y.

Wax is EVACOTE® 7089, a wax blend comprising petroleum wax commercially available from The International Group of Toronto, CA.

Referring now to the data from Table 3, Encapsulated Particles E-G exhibit excellent processing characteristics and do not exhibit clumping during processing.

To form Encapsulated Particles H-M, a polyurethane layer is disposed about a Core Particle. The compositions used to form Encapsulated Particles H-M, in grams, are set forth below in Tables 4 and 5. A polyol component is prepared by mixing, in a first container, two or more polyols (collectively referred to as a polyol component), as set forth in Tables 4 and 5 below. The polyol component, in the first container, is preheated to a temperature of 150° F. An Isocyanate, as set forth in Tables 4 and 5 below is mixed with Silicone Surfactant B and preheated to a temperature of 150° F. in a second container. The Core Particle, as set forth in Tables 4 and 5 below, is preheated to a temperature of 150° F. in a third container. Once preheated, the Core Particle is added to a reaction vessel having a roller speed of 26 rpm. The reaction vessel is not heated. Subsequently, one-half of the total weight of the Isocyanate, which is preheated, is added to the reaction vessel and agitated for 2 minutes with the Core Particle. Next, all of the polyol component, which is preheated, is added to the reaction vessel and agitated with the Isocyanate and the Core Particle previously added, for 10 minutes. Lastly, the remaining Isocyanate, i.e., the other one-half of the Isocyanate is added to the reaction vessel and agitated, with the Polyol component, the Isocyanate, and the Core Particle previously added, for 10 minutes. During agitation, the polyol component and the Isocyanate react to form the polyurethane layer disposed about the Core Particle.

To form Comparative Encapsulated Particles E and F, a polyurethane layer is disposed on a Core Particle. The compositions used to form Comparative Encapsulated Particles E and F, in grams, are set forth in Table 4 below. Comparative Encapsulated Particles E and F are formed with the same method as described immediately above for Encapsulated Particles H-M.

Encapsulated Particles H-M and Comparative Encapsulated Particles E and F are evaluated to determine performance properties including agglomeration (clumping) and dissolution (%). The results of the evaluations are also set forth in Tables 4 and 5 below.

TABLE 4

|  | Encapsulated Particle H | Encapsulated Particle I | Comparative Encapsulated Particle E | Comparative Encapsulated Particle F |
|---|---|---|---|---|
| Polyol B | 11.3 | 22.7 | 11.3 | 22.7 |
| Polyol D | 34.0 | 68.0 | 34.0 | 68.0 |
| Silicone Surfactant B (Added to Isocyanate) | 0.3 | 0.7 | — | — |
| Isocyanate Comp. | 34.3 | 68.6 | 34.7 | 69.3 |
| Core Particle | 4000.0 | 4000.0 | 4000.0 | 4000.0 |
| Total | 4080.0 | 4160.0 | 4080.0 | 4160.0 |
| % Coating Applied (based on 100 parts by weight core particle) | 2 | 4 | 2 | 4 |
| Agglomeration | No Clumps | No Clumps | Clumps | Clumps |
| Dissolution (%) (Day 7 with 2% Wax based on 100 parts by weight core particle) | 88.8 | 62.7 | 49.2 | 40.1 |

TABLE 5

|  | Encapsulated Particle J | Encapsulated Particle K | Encapsulated Particle L | Encapsulated Particle M |
|---|---|---|---|---|
| Polyol B | 22.7 | 22.7 | 22.7 | 24.6 |
| Polyol D | 68.0 | 68.0 | 68.0 | 36.9 |
| Polyol E | — | — | — | 36.9 |
| Silicone Surfactant A | — | 0.7 | — | — |
| Silicone Surfactant B | 1.4 | 0.7 | 0.7 | 0.6 |
| Silicone Surfactant C | — | — | 0.7 | — |
| Isocyanate Comp. | 67.9 | 68.6 | 68.6 | 61.1 |
| Core Particle | 4000.0 | 4000.0 | 4000.0 | 4000.0 |
| Total | 4160.0 | 4160.7 | 4160.7 | 4160.0 |
| % Coating Applied (based on 100 parts by weight core particle) | 4% | 4% | 4% | 4% |
| Agglomeration Dissolution (%) (Day 7 with 2 % Wax based on 100 parts by weight core particle) | No Clumps 81.4 | No Clumps 84.8 | No Clumps 68.7 | No Clumps 59.2 |

Polyol E is PLURACOL® GP 1135, a polyol commercially available from BASF Corporation of Florham Park, N.J.

Silicone Surfactant C is DABCO® DC5043, a silicone surfactant commercially available from Air Products and Chemicals, Inc. of Allentown, Pa.

Referring now to the data from Tables 4 and 5, Encapsulated Particles H-M exhibit excellent processing characteristics and do not exhibit clumping during processing.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. An encapsulated particle comprising:
   A. a core particle comprising a fertilizer; and
   B. a polyurethane layer disposed about said core particle and comprising the reaction product of;
      (i) an isocyanate, and
      (ii) a polyol component comprising:
         a. a first polyol having a nominal functionality of at least 2.5 and a hydroxyl number of from 20 to 300 mg KOH/g; and
         b. a second polyol different than said first polyol and derived from an aromatic amine-based initiator comprising the formula:

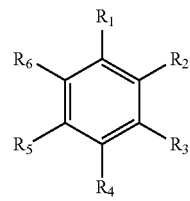

wherein $R_1$ comprises one of an alkyl group, an amine group, and a hydrogen; and
   wherein each of $R_2$-$R_6$ independently comprise one of an amine group and a hydrogen, so long as at least one of $R_1$-$R_6$ is an amine group;
   in the presence of a silicone surfactant comprising a polysiloxane backbone and polyether side chains;
   wherein the polyurethane layer comprises said silicone surfactant.

2. An encapsulated particle as set forth in claim 1 wherein said first polyol has a viscosity at 25° C. of from 100 to 2,000 CPS.

3. An encapsulated particle as set forth in claim 1 wherein said first polyol has a nominal functionality of from 2.75 to 5, a hydroxyl number of from 100 to 300 mg KOH/g, a viscosity at 25° C. of from 150 to 700 CPS, and/or a number average molecular weight of from 470 to 1,400 g/mol.

4. An encapsulated particle as set forth in claim 1 wherein said first polyol has a nominal functionality of from 2.75 to 5, a hydroxyl number of from 20 to 100 mg KOH/g, a viscosity at 25° C. of from 400 to 2,000 CPS, and/or a number average molecular weight of from 1,400 to 15,000 g/mol.

5. An encapsulated particle as set forth in claim 1 wherein said first polyol and said second polyol are present in said polyol component in a weight ratio of from 1:1 to 15:1.

6. An encapsulated particle as set forth in claim 1 wherein said silicone surfactant has a viscosity at 25° C. of from 100 to 1,500 CPS.

7. An encapsulated particle as set forth in claim 1 further comprising a petroleum wax disposed about said core particle.

8. An encapsulated particle as set forth in claim 1 wherein said core particle comprises urea.

9. An encapsulated particle as set forth in claim 1 wherein said core particle has a dissolution of less than 60% by weight after 7 days of aging in water at 38° C.

10. A method of encapsulating a core particle, said method comprising the steps of:
   A. providing a core particle comprising fertilizer;
   B. providing a silicone surfactant comprising a polysiloxane backbone and polyether side chains;
   C. providing an isocyanate;
   D. providing a polyol component comprising:
      a first polyol having a nominal functionality of at least 2.5 and a hydroxyl number of from 20 to 300 mg KOH/g; and
      a second polyol different than said first polyol and derived from an aromatic amine-based initiator comprising the formula:

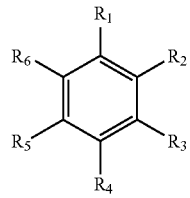

wherein $R_1$ comprises one of an alkyl group, an amine group, and a hydrogen; and
      wherein each of $R_2$-$R_6$ independently comprise one of an amine group and a hydrogen, so long as at least one of $R_1$-$R_6$ is an amine group;
   E. mixing the isocyanate and the polyol component; and
   F. encapsulating the core particle with a polyurethane layer which comprises the reaction product of the isocyanate and the polyol component, wherein the polyurethane layer is formed in the presence of the silicone surfactant.

11. A method as set forth in claim 10 further comprising the step of heating at least one of the core particle, the isocyanate, the polyol component, and the polyorganosiloxane to a temperature greater than 40° C. prior to or simultaneous with the step of mixing the isocyanate and the polyol component.

12. A method as set forth in claim 10 wherein the step of mixing the isocyanate and the polyol component is conducted prior to the step of encapsulating the core particle with the polyurethane layer.

13. A method as set forth in claim 10 wherein the step of mixing the isocyanate and the polyol component is conducted simultaneous with the step of encapsulating the core particle with the polyurethane layer.

14. A method as set forth in claim 13 further comprising the step of spraying the isocyanate onto the core particle and the step of spraying the polyol component onto the core particle.

15. A method as set forth in claim 14 wherein the step of spraying the isocyanate onto the core particle is conducted prior to the step of spraying the polyol component onto the core particle.

16. A method as set forth in claim 10 further comprising the step of applying a petroleum wax to the core particle.

17. A system for encapsulating a core particle comprising a fertilizer with a polyurethane layer comprising a silicone surfactant comprising a polysiloxane backbone and polyether side chains, said system comprising:
   A. an isocyanate;
   B. a polyol component comprising:
      a first polyol having a nominal functionality of at least 2.5 and a hydroxyl number of from 20 to 300 mg KOH/g; and
      a second polyol different than said first polyol and derived from an aromatic amine-based initiator comprising the formula:

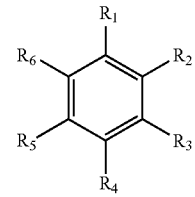

wherein $R_1$ comprises one of an alkyl group, an amine group, and a hydrogen; and
      wherein each of $R_2$-$R_6$ independently comprise one of an amine group and a hydrogen, so long as at least one of $R_1$-$R_6$ is an amine group;
   C. said silicone surfactant; and
   D. said core particle comprising the fertilizer.

* * * * *